(12) United States Patent
Ogami

(10) Patent No.: US 7,149,477 B2
(45) Date of Patent: Dec. 12, 2006

(54) RADIO-PARAMETER CONTROL IN MOBILE RADIO COMMUNICATIONS SYSTEM

(75) Inventor: Tadashi Ogami, Tokyo (JP)

(73) Assignee: Nec Corporation (JP)

( * ) Notice: Subject to any disclaimer, the term of this patent is extended or adjusted under 35 U.S.C. 154(b) by 108 days.

(21) Appl. No.: 10/765,476

(22) Filed: Jan. 28, 2004

(65) Prior Publication Data

US 2004/0185863 A1 Sep. 23, 2004

(30) Foreign Application Priority Data

Jan. 28, 2003 (JP) ............................. 2003-018847

(51) Int. Cl.
*H04B 17/00* (2006.01)
(52) U.S. Cl. ................. 455/67.11; 455/67.11; 455/88; 455/423; 455/456.1; 455/353; 455/67.13; 455/124; 455/404.2; 379/357; 342/450; 342/453; 342/457; 342/357.09
(58) Field of Classification Search ................ 455/446, 455/423, 67.1, 63.2, 456, 422, 67.4, 67.11, 455/88, 456.1, 353, 67.13, 404.2; 702/3, 702/2, 424; 342/450, 457, 453
See application file for complete search history.

(56) References Cited

U.S. PATENT DOCUMENTS

| | | | |
|---|---|---|---|
| 5,058,201 A * | 10/1991 | Ishii et al. .................. 455/447 |
| 6,490,460 B1 * | 12/2002 | Soliman ...................... 455/522 |
| 6,799,045 B1 * | 9/2004 | Brouwer ...................... 455/453 |
| 2002/0032008 A1 * | 3/2002 | Pinola ........................ 455/67.1 |
| 2004/0063430 A1 * | 4/2004 | Cave et al. .................. 455/436 |
| 2004/0137915 A1 * | 7/2004 | Diener et al. ............. 455/456.1 |
| 2004/0198234 A1 * | 10/2004 | Wacker et al. ........... 455/67.13 |

FOREIGN PATENT DOCUMENTS

| | | |
|---|---|---|
| JP | 2001-136558 | 5/2001 |
| JP | 2001-136562 | 5/2001 |

* cited by examiner

*Primary Examiner*—Charles N Appiah
*Assistant Examiner*—Randy Peaches
(74) *Attorney, Agent, or Firm*—Dickstein, Shapiro, LLP.

(57) ABSTRACT

A radio-parameter control method allowing fine radio-parameter setting to improve communication quality is disclosed. Fixed stations are distributed at predetermined locations in a service area. A fixed station monitors reception condition of a pilot channel signal and transmits the monitored condition data back to a corresponding base station. A radio network control station statistically analyzes the monitored condition for each fixed station and estimates a future location of a mobile station. Radio parameters for use in radio communication between the mobile station and a base station corresponding to the future location of the mobile station are controlled based on statistical condition data at the future location of the mobile station.

11 Claims, 8 Drawing Sheets

DATA MEMORY 205

| MONTH, DAY OF WEEK (SUN-SAT), TIME PERIOD ($T_1$-$T_M$) | | | |
|---|---|---|---|
| | LOCATION AND AREA | MONITORED DATA | WEATHER |
| $FS_1$ | $L_1$ | $RL_1$, $DSD_1$ | FINE |
| $FS_2$ | $L_2$ | $RL_2$, $DSD_2$ | CLOUDY |
| $FS_3$ | $L_3$ | $RL_3$, $DSD_3$ | CLOUDY |
| ⋮ | ⋮ | ⋮ | ⋮ |
| $FS_N$ | $L_N$ | $RL_N$, $DSD_N$ | RAINY |

RL: RECEIVED SIGNAL LEVEL
DSD: DEGREE OF SIGNAL DETERIORATION

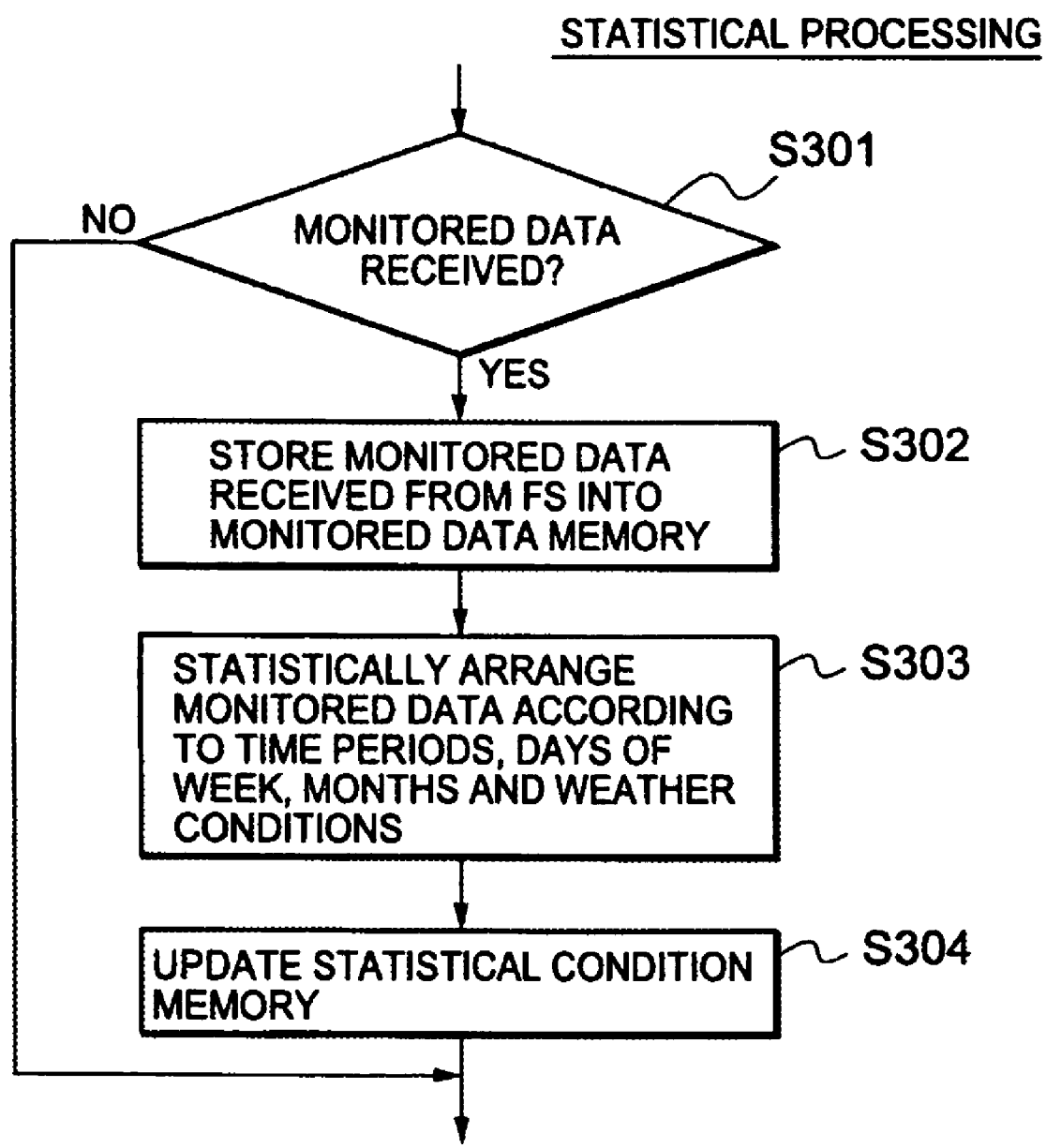

RADIO-PARAMETER CONTROL IN MOBILE RADIO COMMUNICATIONS SYSTEM

BACKGROUND OF THE INVENTION

1. Field of the Invention

The present invention relates to a mobile radio communications system and in particular to a control technique of radio parameters in the mobile radio communications system.

2. Description of the Related Art

A mobile radio communications system, typically a code division multiple access (CDMA) radio communication system, is composed of a plurality of base stations each forming radio zones (cells or sectors) to provide a service area. A mobile station (MS) can move throughout the service area without interrupting communication with a given base station. Since the mobile station moves away from or closer to a base station, into a building or between buildings, or across boundaries between adjacent radio zones, a radio-frequency (RF) propagation condition will dynamically change. Such changing RF propagation conditions are likely to cause poor communication, especially when communication needs to be handed off from one base station to another. To improve the quality of communications, some handoff control techniques have been proposed.

Japanese Patent Application Unexamined Publication No. P2001-136558A discloses a handoff-parameter control technique using a status monitor installed at a location in an overlapping area of two adjacent radio zones. More specifically, each base station periodically transmits a pilot signal and the status monitor receives the pilot signal to monitor Ec/Io, where Ec is a received signal strength of the pilot signal and Io is a received interference strength. The conventional handoff-parameter control technique changes handoff parameters (e.g. IS-95 CDMA soft handoff parameters such as an add threshold T_ADD and a drop threshold T_DROP) based on the monitored Ec/Io at all times. Since the handoff parameters are controlled depending on Ec/Io in which Io may dynamically change, the handoff parameters can be rapidly set to appropriate values in response to varying loads of the system.

However, the conventional handoff-parameter control technique uses the status monitor installed only in an overlapping area of two adjacent radio zones. Accordingly the handoff parameter control can be performed using the monitored Ec/Io only when a mobile station is moving by the status monitor.

Japanese Patent Application Unexamined Publication No. P2001-136562A discloses a system for obtaining location information of a mobile station by providing a plurality of point communication terminals within each cell to allow accurate location detection of a mobile station. However, this conventional system is designed to obtain accurate location information of a mobile station, not to control radio parameters.

SUMMARY OF THE INVENTION

An object of the present invention is to provide a radio-parameter control method and system, which can improve communication quality by performing fine radio-parameter setting.

Another object of the present invention is to provide a radio-parameter control method, which can control radio parameters for a mobile station before reaching a predicted location within a radio zone.

According to the present invention, a system for controlling radio parameters for use in radio communication between a base station and a mobile station, includes: a plurality of mobile stations, each of which has a position detector for detecting a current location of its own; a plurality of base stations each forming a plurality of radio zones, in which a mobile station is allowed to communicate with a corresponding base station, wherein each of the base stations periodically transmits a down-link reference signal; a plurality of fixed stations, which are distributed at predetermined locations in a service area composed of the plurality of radio zones, wherein each of the fixed stations receives the down-link reference signal from a corresponding base station to produce received-signal condition data of the down-link reference signal; a statistical analyzer for statistically analyzing the received-signal condition data received from each of the plurality of fixed stations to store statistical condition data at each of the fixed stations in a statistical condition memory; a mobile-station movement estimator for estimating a future location of the mobile station based on detected current locations of the mobile station and the predetermined locations of the fixed stations; and a parameter controller for controlling radio parameters for use in radio communication between the mobile station and a base station corresponding to the future location of the mobile station based on statistical condition data at the future location of the mobile station.

The fixed stations are preferably distributed at predetermined locations where radio-frequency propagation environment easily changes or a number of mobile stations are likely to congregate.

The radio communication between a base station and a mobile station preferably conforms to a code division multiple access (CDMA) scheme. Each of the fixed stations receives a down-link pilot channel signal from a corresponding base station to monitor a received-signal strength as condition data.

The statistical analyzer may analyze the received-signal condition data for each of the fixed stations according to at least one of time periods of day, days of week, months and weather conditions around respective ones of the fixed stations. The weather conditions may be supplied from an outside system such ass a maintenance and operation center.

Each of the fixed stations may transmit the received-signal condition data to the statistical analyzer by a wireless channel. Alternatively, the received-signal condition data may be transmitted by a wired channel.

According to another aspect of the present invention, A method for controlling radio parameters for use in radio communication between a base station and a mobile station in a mobile radio communication system comprising: a plurality of mobile stations, each of which has a position detector for detecting a current location of its own; a plurality of base stations each forming a plurality of radio zones, in which a mobile station is allowed to communicate with a corresponding base station, wherein each of the base stations periodically transmits a down-link reference signal; and a plurality of fixed stations, which are distributed at predetermined locations in a service area composed of the plurality of radio zones, wherein each of the fixed stations receives the down-link reference signal from a corresponding base station to produce received-signal condition data of the down-link reference signal, wherein the method comprises: a) receiving the current location of the mobile station; b) receiving the received-signal condition data of the down-link reference signal from each of the fixed stations; c) statistically analyzing the received-signal condition data to store statistical condition data at each of the fixed stations in a statistical condition memory; d) estimating a future location of the mobile station based on detected current locations of the mobile station and the predetermined locations of the fixed stations; and e) controlling radio parameters for use in radio communication between the mobile station and a base station corresponding to the future location of the mobile station based on statistical condition data at the future location of the mobile station.

The step c) preferably includes the step of statistically arranging the received-signal condition data according to at least one of time periods of day, days of week, months and weather conditions around respective ones of the fixed stations, wherein the statistical condition data are retrievably stored in the statistical condition memory.

According to still another aspect of the present invention, a mobile radio communications system includes: a plurality of mobile stations, each of which has a position detector for detecting a current location of its own; a plurality of base stations each forming a plurality of radio zones, in which a mobile station is allowed to communicate with a corresponding base station, wherein each of the base stations periodically transmits a down-link reference signal; a plurality of fixed stations, which are distributed at predetermined locations in a service area composed of the plurality of radio zones, wherein each of the fixed stations receives the down-link reference signal from a corresponding base station to produce received-signal condition data of the down-link reference signal; and a radio network control station accommodating the mobile stations, the base stations and the fixed stations, wherein the radio network control station comprises: a statistical analyzer for statistically analyzing the received-signal condition data received from each of the plurality of fixed stations to store statistical condition data at each of the fixed stations in a statistical condition memory; a mobile-station movement estimator for estimating a future location of the mobile station based on detected current locations of the mobile station and the predetermined locations of the fixed stations; and a parameter controller for controlling radio parameters for use in radio communication between the mobile station and a base station corresponding to the future location of the mobile station based on statistical condition data at the future location of the mobile station.

As described above, according to the present invention, RF condition at an estimated location that a mobile station will reach can be predicted based on statistical condition data. Accordingly, necessary radio parameters can be controlled depending on the predicted condition and therefore a more highly accurate radio parameter control can be achieved. Since the statistical condition data stored in the statistical condition memory are updated at regular intervals, the latest statistical condition data can be used to predict RF condition at a desired location where a mobile station will make an approach.

BRIEF DESCRIPTION OF THE DRAWINGS

FIG. 7 is a flowchart showing statistical processing according to the first embodiment of the present invention;

DESCRIPTION OF THE PREFERRED EMBODIMENT

System Configuration

Figure 1:
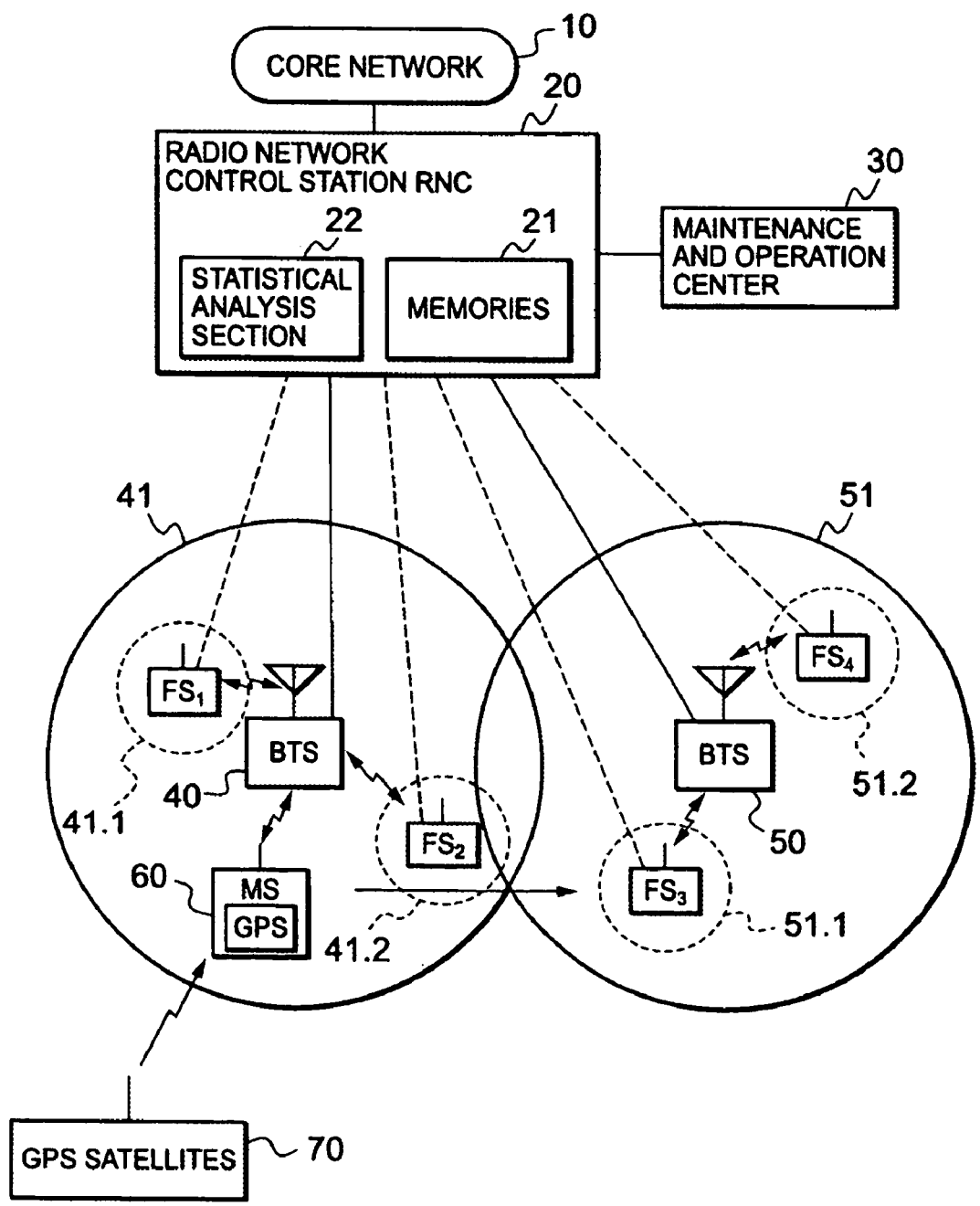
FIG. 1 is a block diagram showing a mobile radio communications system according to a first embodiment of the present invention.

Referring to FIG. 1, a CDMA communications system according to an embodiment of the present invention is provided with at least one radio network control station (RNC) 20 connected to a core network 10. The radio network control station 20 accommodates a plurality of radio base stations, each controlling radio zones or cells with adjacent radio zones overlapping to form a wide service area. A mobile station (MS) 60 can move in the service area without interrupting communications. In FIG. 1, for the sake of simplicity, one radio network control station 20 and two base stations 40 and 50 are shown, which provide radio zones 41 and 51, respectively. a plurality of radio network control stations 20 may be provided to increase the number of base stations accommodated therein. The radio network control station 20 may be connected to a maintenance and operation center 30 directly or through a network (not shown). The maintenance and operation center 30 can transmit weather information for each radio zone to the radio network control station 20. Alternatively, such weather information may be supplied from a weather observation system or manually inputted by an operator.

Within each radio zone, a fixed station FS is installed at a predetermined location preferably where radio-frequency propagation environment easily changes or a number of mobile stations are likely to congregate. It is possible to distribute a plurality of fixed stations at predetermined locations in a service area of the mobile communications system so that a fixed station FS is installed where radio-frequency propagation environment easily changes or a number of mobile stations are likely to congregate. In FIG. 1, it is assumed for the sake of simplicity that fixed stations $FS_1$ and $FS_2$ are installed in the radio zone 41 and fixed stations $FS_3$ and $FS_4$ are installed in the radio zone 51. Each fixed station FS receives a pilot channel signal from a corresponding base station BTS to monitor a received signal strength and transmits the monitored data to the radio network control station 20 through the corresponding base station BTS.

The respective fixed stations FSs can communicate with corresponding base stations by radio channels. Here, the fixed stations $FS_1$ and $FS_2$ can communicate with the base station 40 and fixed stations $FS_3$ and $FS_4$ can communicate with the base station 50. Since each fixed station FS transmits only monitored data to the radio network control station 20 through a corresponding base station, interference power on up-link increases in some degree. If an increase in interference power on up-link is not negligible, then each fixed station FS may be connected to the radio network control station 20 by a wired line as shown by dashed lines in FIG. 1.

The mobile station 60 is typically a mobile telephone set or a portable communication terminal, which is provided with a position detecting means for detecting a more accurate location of the mobile station, such as a GPS (Global Positioning System) receiver. In this embodiment, the mobile station 60 is equipped with the GPS receiver, which can receive GPS signals from GPS satellites 70 to detect its current location. The mobile station 60 transmits current location data to the radio network control station 20 through a corresponding base station. Alternatively, the mobile station 60 may transmit received GPS data to the radio network control station 20 through a corresponding base station and the radio network control station 20 may compute the location of the mobile station 60. In FIG. 1, one mobile station 60 is shown for the sake of simplicity. Needless to say, a plurality of mobile stations can be accommodated in each radio zone. Each mobile station can communicate with another terminal or mobile station accommodated in another network through the radio network control station 20 and the core network 10.

The radio network control station 20 is provided with memories 21 and a statistical analysis section 22, which performs statistical processing of monitored data received from the fixed stations as described later. The statistically processed condition data are stored in a monitored data memory of the memories 21. Based on the statistically processed condition data, the current location, direction and velocity of a moving mobile station 60, and current environment such as weather information, the radio network control station 20 previously controls radio parameters, such as a transmission power control reference level and handover criteria, for a mobile station, a corresponding base station and a next base station which will accommodate the mobile station soon. The details will be described later.

In this manner, the radio parameters are modified in advance of movement of the mobile station and the statistically processed condition data are updated periodically, resulting in improved communication between a moving mobile station 60 and related base stations. The accuracy of statistically processed condition data can be made higher depending on the number of fixed stations and the distribution thereof.

Radio Network Control Station

Figure 2:
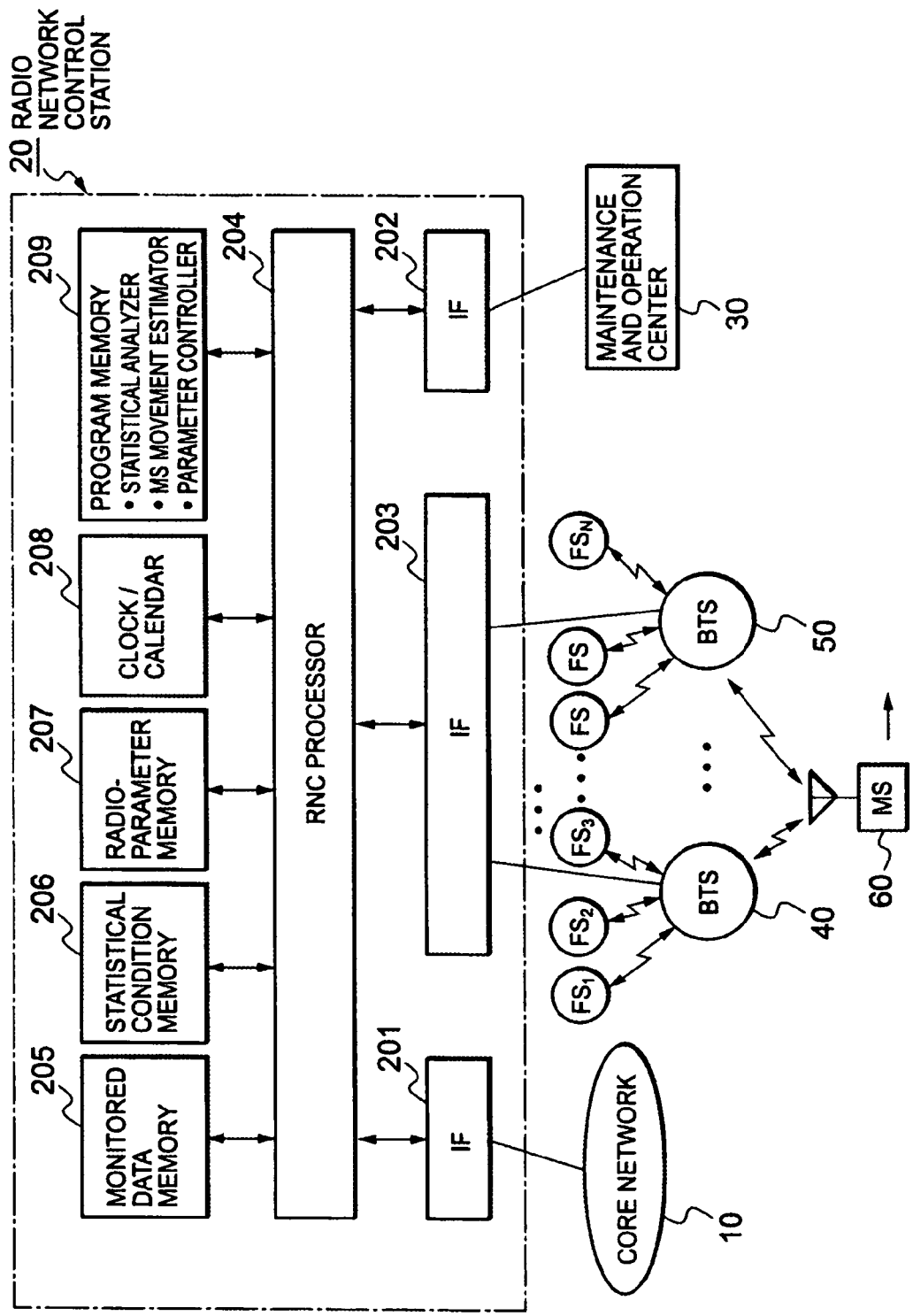
FIG. 2 is a block diagram showing an example of a radio network control station of the mobile radio communications system according to the first embodiment of the present invention.

As shown in FIG. 2, the radio network control station 20 is connected to the core network 10, the maintenance and operation center 30, and the accommodated base stations through respective interfaces 201–203. The radio network control station 20 is provided with a processor 204, which is a program-controlled processor for running software programs to implement radio network control operations. The processor 204 is connected to a monitored data memory 205, a statistical condition memory 206, a radio-parameter memory 207, a clock/calendar circuit 208, and a program memory 209. The program memory 209 previously stores necessary software programs including a statistical analyzer, a mobile-station movement estimator, a parameter controller, and other necessary programs.

The monitored data memory 205 stores condition data that are monitored by respective ones of the fixed stations $FS_1$–$FS_N$. Such condition data monitored by each fixed station includes a received signal strength and a signal deterioration degree of a pilot signal received from at least one base station. Weather information around each fixed station, which is supplied by the maintenance and operation center 30, may be also stored in the monitored data memory 205.

The statistical condition memory 206 stores statistically processed condition data for respective ones of the fixed stations $FS_1$–$FS_N$. As described in detail later, the monitored condition data are statistically analyzed according to various conditions, for example, time periods of a day. The statistically processed condition data are stored for respective ones of the fixed stations $FS_1$–$FS_N$ and are used to predict a RF propagation condition which a moving mobile station 60 is to reach.

The radio-parameter memory 207 stores radio parameters including a reference level for transmission power control and handover criteria (e.g. IS-95 CDMA soft handoff parameters such as an add threshold T_ADD and a drop threshold T_DROP). As described in detail later, these radio parameters for a mobile station and base stations communicating with the mobile station are updated in advance depending on a predicted location of the mobile station and its predicted RF propagation environment.

The clock/calendar circuit 208 supplies a time of day to the processor 204. Such a time of day is used to determine time periods of day, days of week, and months.

The program memory 209 stores control programs necessary for the RNC operations, including statistical analyzer, mobile-station movement estimator, and a parameter controller. The processor 204 reads these programs to perform statistical processing of monitored data, computation of the direction and velocity of a moving mobile station 60, prediction of future locations of the mobile station 60, and parameter updates depending on predicted locations of the mobile station 60 and predicted RF propagation environments.

Fixed Station

Figure 3:
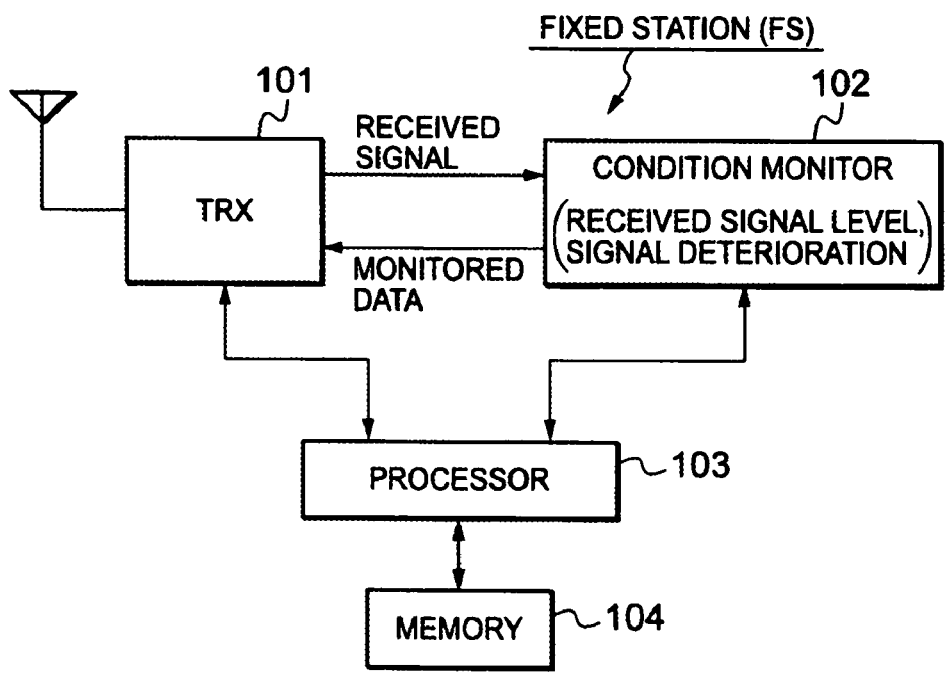
FIG. 3 is a block diagram showing an example of a fixed station of the mobile radio communications system according to the first embodiment of the present invention.

As shown in FIG. 3, each of the fixed stations $FS_1$–$FS_N$ is provided with a transceiver 101, a condition monitor 102, a program-controlled processor 103 and a memory 104. The transceiver 101 receives a pilot signal or a reference signal on a down-link common pilot channel (CPICH) from a corresponding base station at all times. The received signal is output to the condition monitor 102. The condition monitor 102 monitors a power level of a received signal and a degree of received-signal deterioration for each radio zone/frequency. The power level of a received signal and the degree of received-signal deterioration are returned as monitored condition data to the transceiver 101. The monitored condition data are transmitted on an up-link random access channel back to the radio network control station 20 through the corresponding base station.

The processor 103 reads a program from the memory 104 to control the transceiver 101 and the condition monitor 102 so as to perform the above-described condition monitoring operation. The fixed station FS is installed preferably at a location where radio-frequency propagation environment easily changes or a number of mobile stations are likely to congregate.

As described before, if an increase in interference power on up-link is not negligible, then each fixed station FS may be connected to the radio network control station 20 by a wired line as shown by dashed lines in FIG. 1. In such a case, the transceiver 101 is replaced with a receiver and a wired transmission controller is further provided so as to transmit the monitored condition data to the radio network control station 20 through the wired line.

Mobile Station

Figure 4:
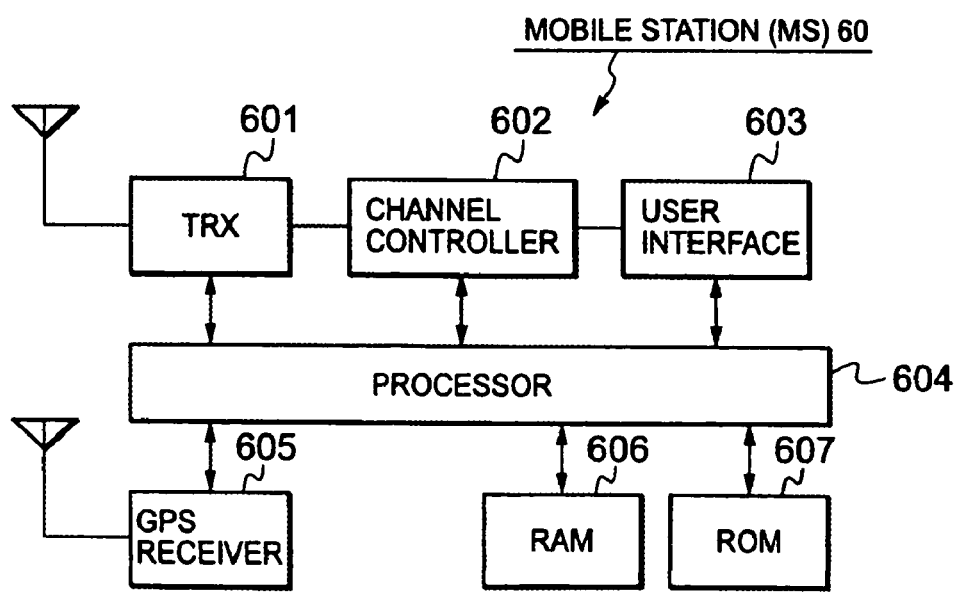
FIG. 4 is a block diagram showing an example of a mobile station of the mobile radio communications system according to the first embodiment of the present invention.

As shown in FIG. 4, each of mobile stations 60 is provided with a transceiver 601, a channel controller 602, a user interface 603, and a processor 604. The processor 604 may be a program-controlled processor, which performs mobile communication operations such as mobile telephone communication by running programs stored in the ROM 607 thereon using a RAM 606. The mobile station 60 can communicate with the other party through a corresponding base station, the radio network control station 20 and the core network 10.

The mobile station 60 is further provided with a GPS receiver 605, which receives GPS data from GPS satellites and compute the location of its own from the GPS data. The processor 604 notifies the radio network control station 20 of the detected location information through the corresponding base station.

Alternatively, the mobile station 60 may transfer the received GPS data to the radio network control station 20 without computing its own location. In this case, the radio network control station 20 computes the location of the mobile station 60.

Monitored Data Memory

Figure 5:
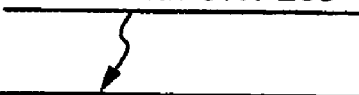
FIG. 5 is a diagram showing an example of contents of a data memory in the radio network control station as shown in FIG. 2.

As shown in FIG. 5, the monitored data memory 205 stores location/area data, monitored condition data and weather information of respective ones of the fixed stations $FS_1$–$FS_N$. Condition data monitored by each fixed station includes a received signal strength (RL) and a signal deterioration degree (DSD) of a pilot signal. These data may be updated at regular intervals and are accumulated for a predetermined time period to allow statistical analysis.

The location/area data $L_1$–$L_N$ indicate predetermined areas around respective ones of the fixed stations $FS_1$–$FS_N$. As shown in FIG. 1, the predetermined areas of the fixed stations $FS_1$, $FS_2$, $FS_3$ and $FS_4$ are indicated by doted circles 41.1, 41.2, 51.1 and 51.2, respectively. The condition data received from a fixed station is estimated to be the RF propagation condition in the predetermined area around the fixed station.

Statistical Condition Memory

Figure 6A:
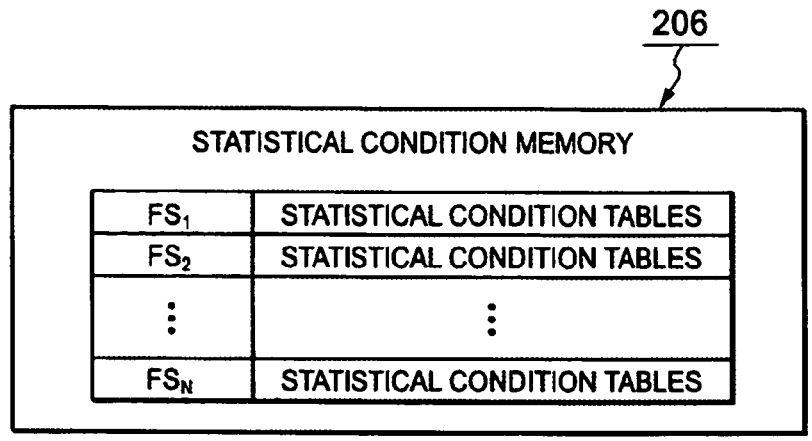
FIG. 6A is a diagram showing a statistical condition memory in the radio network control station as shown in FIG. 2.

As shown in FIG. 6A, the statistical condition memory 206 stores N data records each including statistical condition tables and each corresponding to the fixed stations $FS_1$–$FS_N$. An example of a set of statistical condition tables for a fixed station $FS_i$ is shown in FIG. 6B.

Figure 6B:
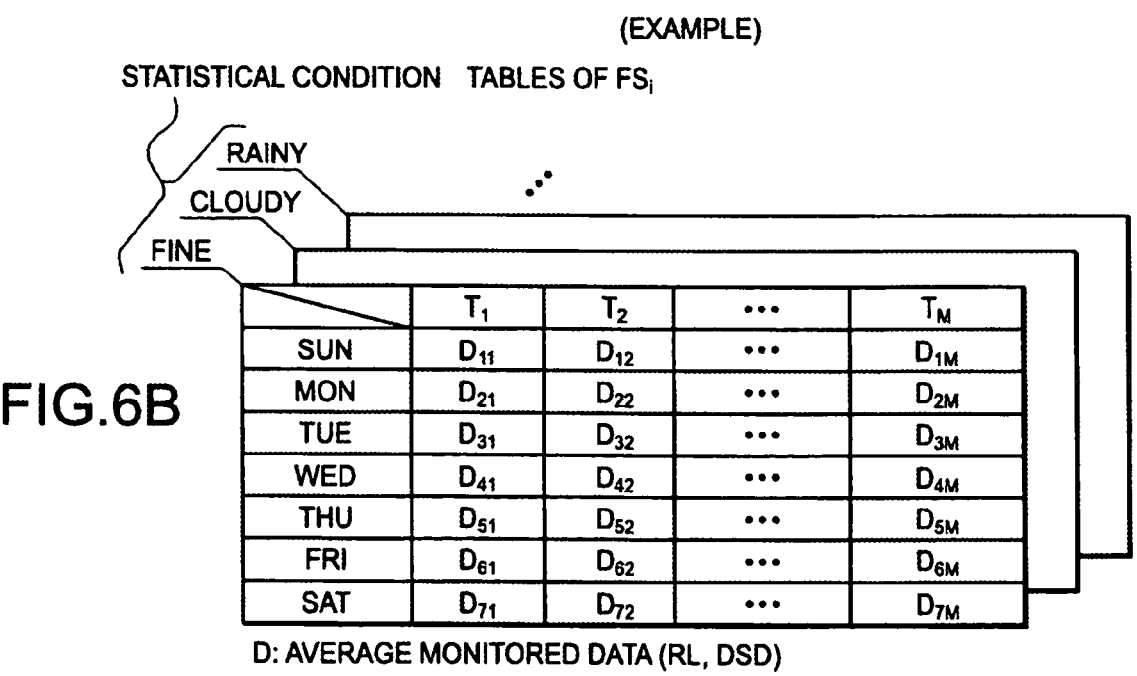
FIG. 6B is a diagram showing an example of statistical conditions tables for a fixed station in the statistical condition memory as shown in FIG. 6A.

As shown in FIG. 6B, a data record for a fixed station $FS_i$ is composed of a plurality of statistical condition tables. In this example, three tables each corresponding to weather conditions are shown: fine; cloudy; and rainy. It is possible to provide a further set of tables each corresponding to months or seasons.

Each table contains monitored condition data, which are arranged in rows indicating days of a week SUN–SAT and columns indicating time periods of day $T_1$–$T_M$. The time periods $T_1$–$T_M$ are obtained by dividing a day (24 hours) by a predetermined number. Each entry identified by a day of a week and a time period of day contains condition data $D_{ij}$ that is obtained by averaging monitored condition data RL and DSD for the time period of day. For example, the average monitored data RL and DSD is $D_{22}$ at the time period $T_2$ of Monday. Such a table format is the same with the "cloudy" and "rainy" tables.

Accordingly, if a time period of day, a day of week, a weather condition and, if necessary, months for a fixed station $FS_i$ are provided, then the RF propagation condition around an arbitrary fixed station $FS_i$ can be estimated by searching the statistical condition memory 206.

Statistical Processing

As described before, each fixed station $FS_i$ transmits its monitored condition data back to the radio network control station 20. The radio network control station 20 statistically analyzes the monitored condition data to produce the statistical condition data as shown in FIGS. 6A and 6B. More detailed statistical processing will be described hereinafter.

Referring to FIG. 7, when having received monitored condition data from fixed stations (YES in step S301), the processor 204 stores the received monitored condition data into the monitored data memory 205 (step S302). Thereafter, the statistical analyzer on the processor 204 reads monitored condition data for each fixed station $FS_i$ from the monitored data memory 205 and statistically arranges them according to time periods of day $T_1$–$T_M$, days of week, months and weather condition around the fixed station $FS_i$ to produce a set of statistical condition tables as shown in FIG. 6B (step S303). The set of statistical condition tables for the fixed station $FS_i$ is stored as an updated one into the statistical condition memory 206 (step S304). The steps S302–S304 are repeatedly performed at regular intervals. An example of the step S303 will be described below.

It is assumed that the radio network control station 20 receives a sequence of condition data D1, D2, . . . Dk from the fixed station $FS_1$ for the time period $T_2$ of day on Sunday (fine weather), where each of the condition data D1, D2, . . . Dk includes a received-signal strength (RL) and a degree of received-signal deterioration (DSD) such as bit-error rate. The statistical analyzer calculates the average of condition data D1, D2, . . . Dk and stores the average as an entry $D_{12}$ of FIG. 6B into the statistical condition tables for the fixed station $FS_1$ of the statistical condition memory 206.

In this manner, average condition data around each fixed station is stored for each time period of day, each day of week, each weather condition, and each month or season. Accordingly, the condition data stored in the statistical condition memory 206 can be retrieved by designating a location, a time period of day, a day of week, a weather condition and a month/season.

Radio Parameter Control

It is assumed that the statistical condition data are stored in the statistical condition memory 206 as shown in FIGS. 6A and 6B.

It is further assumed for the sake of simplicity that the mobile station 60 equipped with the GPS receiver is moving, as shown in FIG. 1, near the fixed station $FS_2$ in the radio zone 41 and then enters the adjacent radio zone 51 toward the fixed station $FS_3$ therein. Taking such a case as an example, the radio parameter control operation will be described hereinafter.

As described before, the mobile station 60 receives GPS data from GPS satellites 70 to compute the location of its own from the GPS data and transmits the detected location information to the radio network control station 20 through a corresponding base station 40 or 50 at regular intervals.

Figure 8:
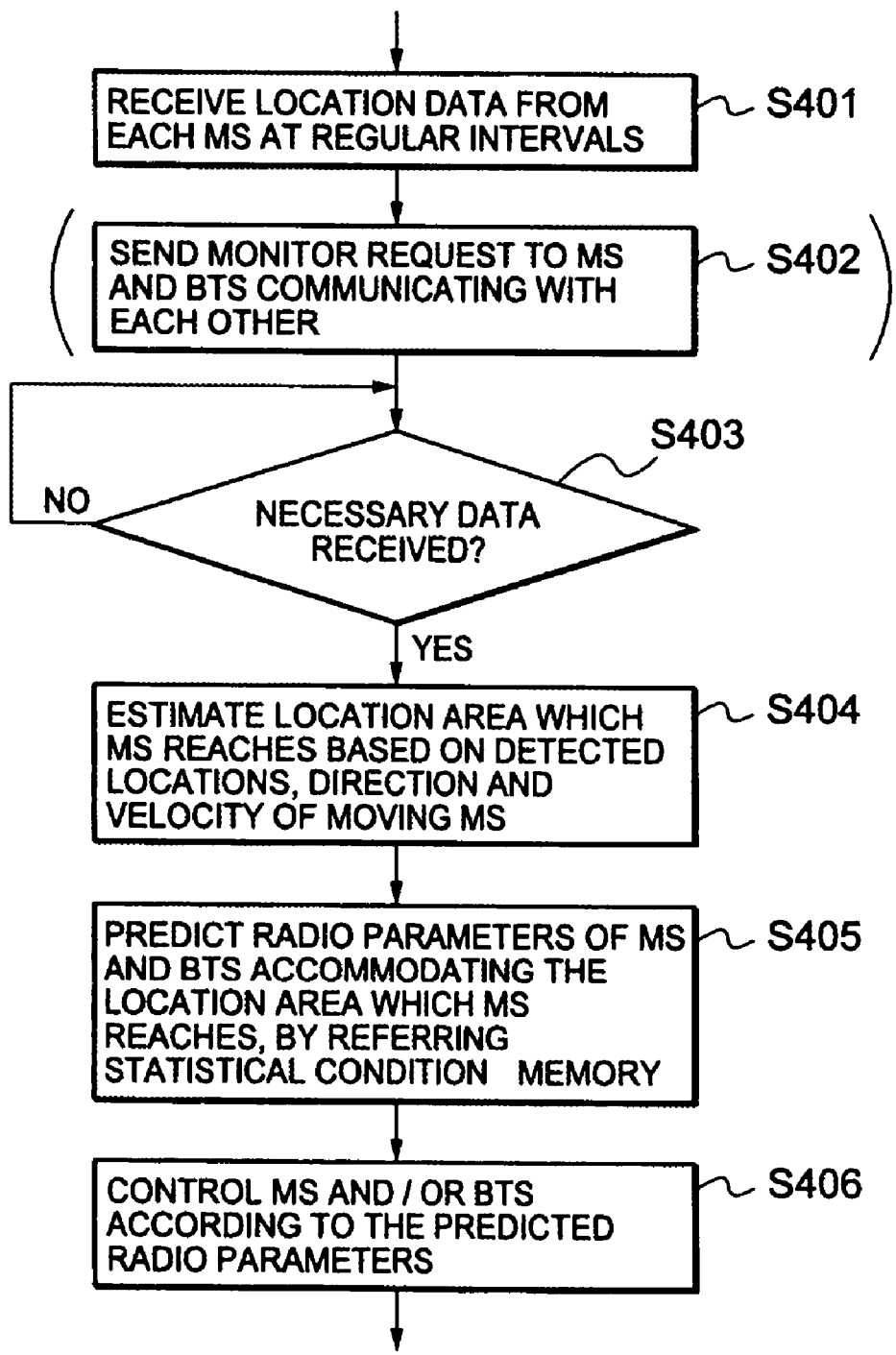
FIG. 8 is a flowchart showing a radio parameter control method according to the first embodiment of the present invention.

Referring to FIG. 8, the radio network control station 20 receives the location data from the mobile station 60 through the base station 40 at regular intervals (step S401).

If necessary, the radio network control station 20 transmits a monitor request to the mobile station 60 and the base station 40 communicating with each other to instruct them to measure a signal level (Ec) and an interference level (Io) (step S402). In the case of W-CDMA (Wideband-CDMA), a monitor request is transmitted to a mobile station and a corresponding base station and thereafter they automatically transmit monitor reports to the radio network control station 20 at regular intervals.

When necessary data including monitor reports and weather information have been received (YES in step S403), the mobile-station movement estimator on the radio network control station 20 computes the moving direction and velocity of the mobile station 60 from the received location information and then estimates a location area to which the mobile station 60 will move from the current location, based on the received location information and the moving direction and velocity of the mobile station 60 and the predetermined locations of the fixed stations $FS_1$–$FS_N$ (step S404).

In this example as shown in FIG. 1, the mobile station 60 passes by the fixed station $FS_2$ in the radio zone 41 and then moves toward the fixed station $FS_3$ in the radio zone 51. In this case, the mobile-station movement estimator first estimates that the mobile station 60 moves closer to the location area 41.2 of the fixed station $FS_2$. Therefore, the parameter controller on the radio network control station 20 uses the current time period, the calendar information and the received weather information of today to search the statistical condition memory 206 for statistical condition data at the fixed station $FS_2$.

Based on the found statistical condition data at the fixed station $FS_2$, the parameter controller predicts radio parameters for the mobile station 60 and the base station 40 (step S405). If it is predicted that a received signal strength at the fixed station $FS_2$ becomes lower than a normal level, then the parameter controller controls the radio parameters so as to increase a transmission power level of the mobile station 60 and the base station 40 by an amount compensating for such an estimated level reduction (step S406). Contrarily, if it is predicted that a received signal strength at the fixed station $FS_2$ becomes higher than a normal level, then the parameter controller controls the radio parameters so as to decrease a transmission power level of the mobile station 60 and the base station 40 by an amount compensating for such an estimated level increase (step S406). In this example, a handover from the base station 40 to the base station 50 may be performed in the location area 41.2 of the fixed station $FS_2$.

Since the radio network control station 20 can know how many mobile stations are now located in the location area 41.2 of the fixed station $FS_2$ based on the received location information, if interference due to a large number of mobile stations is estimated to occur, then the parameter controller also controls the radio parameters for the relevant mobile stations so as to adjust (decrease or increase) their transmission power levels.

When the mobile station 60 enters the radio zone 51 and moves toward the fixed station $FS_3$ in the radio zone 51, the mobile-station movement estimator estimates that the mobile station 60 moves closer to the location area 51.1 of the fixed station $FS_3$. Therefore, the parameter controller uses the current time period, the calendar information and the received weather information of today to search the statistical condition memory 206 for statistical condition data at the fixed station $FS_3$.

Based on the found statistical condition data at the fixed station $FS_3$, the parameter controller predicts radio parameters for the mobile station 60 and the base station 50 (step S405). If it is predicted that a received signal strength at the fixed station $FS_3$ is lower than normal, then the parameter controller controls the radio parameters so as to increase a transmission power level of the mobile station 60 and the base station 50 by an amount compensating for such an estimated level reduction (step S406).

Since the radio network control station 20 can know how many mobile stations are now located in the location area 51.1 of the fixed station FS3 based on the received location information, the parameter controller also controls the radio parameters for the relevant mobile stations to reduce interference.

Figure 9:
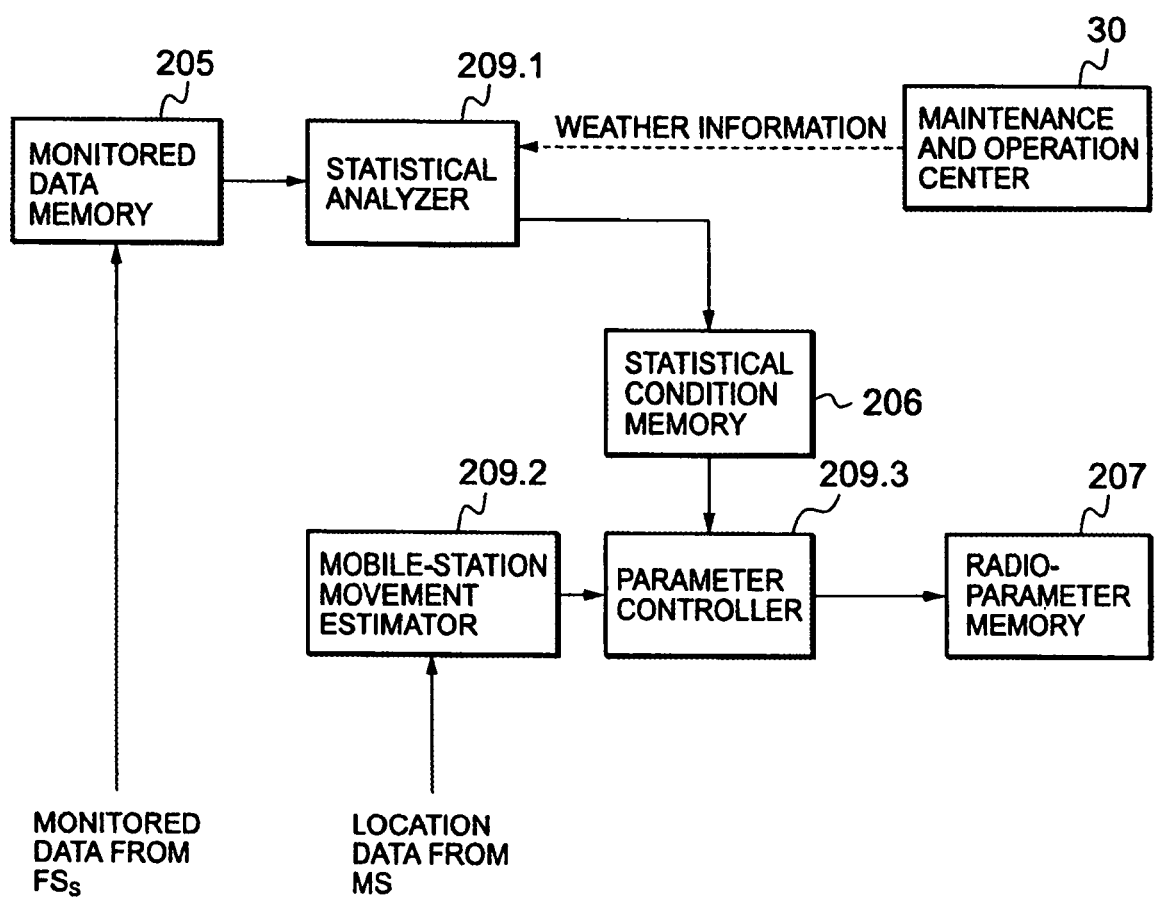
FIG. 9 is a block diagram showing another example of a radio network control station of the mobile radio communications system according to the first embodiment of the present invention.

As shown in FIG. 9, the radio network control station 20 may be implemented by hardware circuits, in which a statistical analyzer 209.1, a mobile-station movement estimator 209.2 and a parameter controller 209.3 are implemented with hardware. Since operations of the statistical analyzer 209.1, the mobile-station movement estimator 209.2 and the parameter controller 209.2 are the same as the above-described operations of the statistical analyzer, mobile-station movement estimator and parameter controller programs, the detailed descriptions are omitted.

As descried above, RF condition at a future location which a mobile station will reach can be predicted based on statistical condition data and therefore necessary radio parameters can be controlled depending on the predicted condition, achieving a further highly accurate radio parameter control. Since the statistical condition memory is updated at regular intervals, the latest statistical condition data can be used to predict RF condition at a desired location where a mobile station will make an approach.

The invention claimed is:

1. A system for controlling radio parameters for use in radio communication between a base station and a mobile station, comprising:
   a plurality of mobile stations, each of which has a position detector for detecting a current location of its own;
   a plurality of base stations each forming a plurality of radio zones, in which a mobile station is allowed to communicate with a corresponding base station, wherein each of the base stations periodically transmits a down-link reference signal;
   a plurality of fixed stations, which are distributed at predetermined locations in a service area composed of the plurality of radio zones, wherein each of the fixed stations receives the down-link reference signal from a corresponding base station to produce received-signal condition data of the down-link reference signal;
   a statistical analyzer for statistically analyzing the received-signal condition data received from each of the plurality of fixed stations to store statistical condition data at each of the fixed stations in a statistical condition memory;
   a mobile-station movement estimator for estimating a future location of the mobile station based on detected current locations of the mobile station and the predetermined locations of the fixed stations; and
   a parameter controller for controlling radio parameters for use in radio communication between the mobile station and a base station corresponding to the future location of the mobile station based on statistical condition data at the future location of the mobile station.

2. The system according to claim 1, wherein the fixed stations, which are distributed at predetermined locations where radio-frequency propagation environment easily changes.

3. The system according to claim 1, wherein the fixed stations, which are distributed at predetermined locations where a number of mobile stations are likely to congregate.

4. The system according to claim 1, wherein the radio communication between a base station and a mobile station conforms to a code division multiple access (CDMA) scheme, wherein each of the fixed stations receives a down-link pilot channel signal from a corresponding base station to monitor a received-signal strength as condition data.

5. The system according to claim 1, wherein the statistical analyzer analyzes the received-signal condition data for each of the fixed stations according to at least one of time periods of day, days of week, months and weather conditions around respective ones of the fixed stations.

6. The system according to claim 5, wherein the weather conditions are supplied from a maintenance and operation center.

7. The system according to claim 1, wherein the fixed stations transmits the received-signal condition data to the statistical analyzer by either wireless or wired channel.

8. A method for controlling radio parameters for use in radio communication between a base station and a mobile station in a mobile radio communication system comprising:
   a plurality of mobile stations, each of which has a position detector for detecting a current location of its own;
   a plurality of base stations each forming a plurality of radio zones, in which a mobile station is allowed to communicate with a corresponding base station, wherein each of the base stations periodically transmits a down-link reference signal; and
   a plurality of fixed stations, which are distributed at predetermined locations in a service area composed of the plurality of radio zones, wherein each of the fixed stations receives the down-link reference signal from a corresponding base station to produce received-signal condition data of the down-link reference signal,
   wherein the method comprises:
   a) receiving the current location of the mobile station;
   b) receiving the received-signal condition data of the down-link reference signal from each of the fixed stations;
   c) statistically analyzing the received-signal condition data to store statistical condition data at each of the fixed stations in a statistical condition memory;
   d) estimating a future location of the mobile station based on detected current locations of the mobile station and the predetermined locations of the fixed stations; and
   e) controlling radio parameters for use in radio communication between the mobile station and a base station corresponding to the future location of the mobile station based on statistical condition data at the future location of the mobile station.

9. The method according to claim 7, wherein the step c) comprises the step of statistically arranging the received-signal condition data according to at least one of time periods of day, days of week, months and weather conditions around respective ones of the fixed stations, wherein the statistical condition data are retrievably stored in the statistical condition memory.

10. A mobile radio communications system comprising:
   a plurality of mobile stations, each of which has a position detector for detecting a current location of its own;
   a plurality of base stations each forming a plurality of radio zones, in which a mobile station is allowed to communicate with a corresponding base station, wherein each of the base stations periodically transmits a down-link reference signal;
   a plurality of fixed stations, which are distributed at predetermined locations in a service area composed of the plurality of radio zones, wherein each of the fixed stations receives the down-link reference signal from a corresponding base station to produce received-signal condition data of the down-link reference signal; and
   a radio network control station accommodating the mobile stations, the base stations and the fixed stations, wherein the radio network control station comprises:
   a statistical analyzer for statistically analyzing the received-signal condition data received from each of the plurality of fixed stations to store statistical condition data at each of the fixed stations in a statistical condition memory;
   a mobile-station movement estimator for estimating a future location of the mobile station based on detected current locations of the mobile station and the predetermined locations of the fixed stations; and
   a parameter controller for controlling radio parameters for use in radio communication between the mobile station and a base station corresponding to the future location of the mobile station based on statistical condition data at the future location of the mobile station.

11. A program instructing a computer to control radio parameters for use in radio communication between a base station and a mobile station in a mobile radio communication system comprising:
   a plurality of mobile stations, each of which has a position detector for detecting a current location of its own;
   a plurality of base stations each forming a plurality of radio zones, in which a mobile station is allowed to communicate with a corresponding base station, wherein each of the base stations periodically transmits a down-link reference signal; and
   a plurality of fixed stations, which are distributed at predetermined locations in a service area composed of the plurality of radio zones, wherein each of the fixed stations receives the down-link reference signal from a corresponding base station to produce received-signal condition data of the down-link reference signal,
   wherein the program comprises the steps of:
   a) receiving the current location of the mobile station;
   b) receiving the received-signal condition data of the down-link reference signal from each of the fixed stations;
   c) statistically analyzing the received-signal condition data to store statistical condition data at each of the fixed stations in a statistical condition memory;
   d) estimating a future location of the mobile station based on detected current locations of the mobile station and the predetermined locations of the fixed stations; and
   e) controlling radio parameters for use in radio communication between the mobile station and a base station corresponding to the future location of the mobile station based on statistical condition data at the future location of the mobile station.

* * * * *